(No Model.)
J. W. DAVIS.
TROLLEY.
No. 478,410. Patented July 5, 1892.
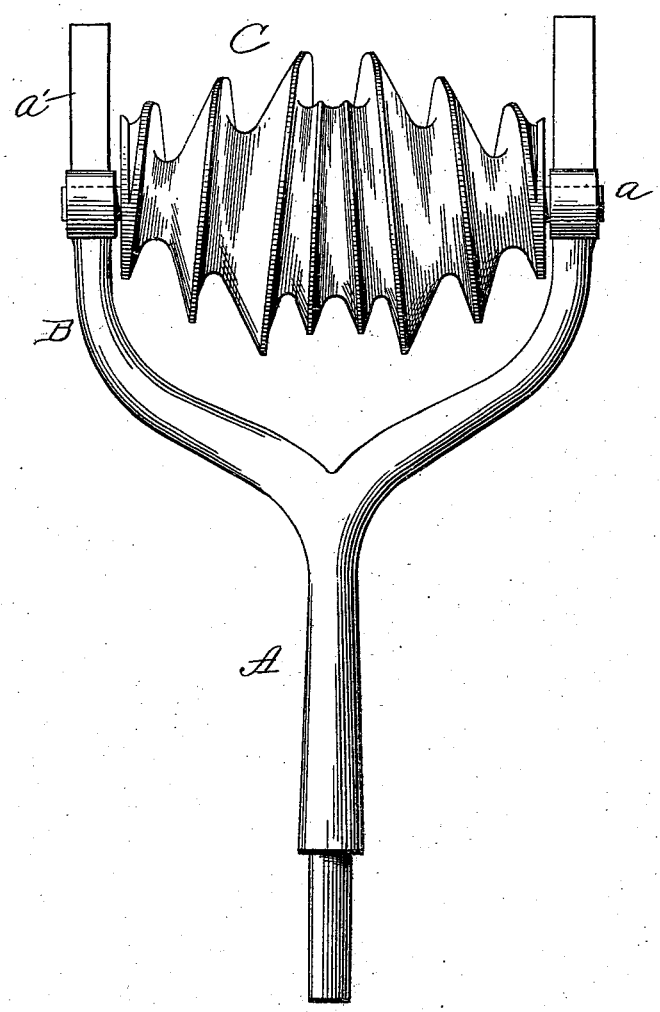

UNITED STATES PATENT OFFICE.

JOHN W. DAVIS, OF LYNN, MASSACHUSETTS.

TROLLEY.

SPECIFICATION forming part of Letters Patent No. 478,410, dated July 5, 1892.

Application filed October 22, 1891. Serial No. 409,534. (No model.)

*To all whom it may concern:*

Be it known that I, JOHN W. DAVIS, a citizen of the United States of America, residing at Lynn, in the county of Essex and State of Massachusetts, have invented certain new and useful Improvements in Trolleys, of which the following is a specification.

My invention is an improvement in trolley-rollers designed for use in connection with the trolley system of electric railways.

My object is to provide a roller or pulley of very simple construction, not liable to get out of order, in one piece, requiring no springs or attachments, equally as effective in winter as in summer, and adapted to keep the wire centrally of the trolley and direct it to the center in case the wire comes in contact with any other portion of the trolley-surface.

In the accompanying drawing the figure represents a side elevation of a trolley-standard provided with my improved trolley.

In the figure the standard of the trolley is shown as of ordinary construction at A. The roller or pulley frame which is swiveled thereon is shown at B. It is forked at its upper end, and between the forks is supported the roller or pulley C. A rod $a$ passes between the forks, and this serves as the bearing for the roller or pulley C.

The trolley is of peculiar shape, and in this lies the essence of my invention. It is not only desirable to keep the wire centrally of the trolley-roller, but in case the wire strikes the roller to one side or the other to direct it to the center. To this end I form the roller elongated and tapering from the center to each end, a groove being provided in the center of the roller, which is the working groove for the wire, and normally this grooved part of the trolley is in contact with the wire. The tapering or conical ends of the trolley or the periphery thereof are provided with deep spiral grooves, the general direction of which runs from the outer ends to the central groove, so that in case the trolley strikes the wire at one end or the other the turning of the trolley in contact with the wire will by reason of the spiral grooves direct the wire to the central groove.

In order to direct the trolley more certainly in contact with the wire, I provide each fork with a wing or projection $a'$, extending above the level of the ends of the fork.

It will be seen that the trolley thus made is simple but effective and that there is nothing to get out of order or to be clogged or rendered ineffective by ice or snow.

Having thus described my invention, what I claim is—

A trolley consisting of an elongated body having tapering ends, with a central groove and spiral grooves about the tapered portions, communicating therewith, the said grooves extending into the body of the material and the flanges bounding said grooves being integral with the body portion, substantially as described.

In testimony whereof I affix my signature in presence of two witnesses.

JOHN W. DAVIS.

Witnesses:
C. H. WELCH,
F. L. MIDDLETON.